United States Patent [19]

Frank et al.

[11] Patent Number: 4,541,758

[45] Date of Patent: Sep. 17, 1985

[54] MEANS AND METHOD FOR LUBRICATING CORE DRILLS

[75] Inventors: Robert G. Frank, Murrysville; Joseph A. Noca, Irwin, both of Pa.

[73] Assignee: PPG Industries, Inc., Pittsburgh, Pa.

[21] Appl. No.: 615,975

[22] Filed: May 31, 1984

[51] Int. Cl.$^4$ .............................................. B23B 35/00
[52] U.S. Cl. ............................ 408/1 BD; 51/209 R; 125/20; 175/393; 408/60; 408/145; 408/206
[58] Field of Search ................. 408/1, 57, 59, 60, 204, 408/205, 206, 207, 703, 82, 84, 85, 145; 125/20; 51/209 R; 299/81; 175/330, 393

[56] References Cited

U.S. PATENT DOCUMENTS

| | | | |
|---|---|---|---|
| 3,016,662 | 1/1962 | Ellis | 51/209 R |
| 3,153,885 | 10/1964 | Keller et al. | 125/20 |
| 3,592,554 | 7/1971 | Takahara | 408/703 |
| 3,617,145 | 11/1971 | Celmer | 408/204 |
| 4,129,401 | 12/1978 | Berthier | 408/703 |

Primary Examiner—Frank T. Yost
Assistant Examiner—Hien H. Phan
Attorney, Agent, or Firm—Robert A. Westerlund, Jr.

[57] ABSTRACT

The present invention includes an insert securably mountable within the chamber of a core drill, such as a chamfering diamond core drill used for drilling and chamfering glass articles. The insert preferably includes a first diverting facility for diverting a first portion of a lubricating/cooling fluid from within the core drill to the inner drilling surfaces of the core drill, and a second diverting facility for diverting a second portion of the lubricating/cooling fluid to the outer drilling surface and chamfering surface of the core drill, to prevent thermal damage to the article being drilled and chamfered, during both the drilling and chamfering steps. The present invention further includes a method of lubricating/cooling an article during drilling and chamfering operations with lubricating/cooling fluid from within the core drill, to prevent thermal damage to the article being drilled.

18 Claims, 4 Drawing Figures

MEANS AND METHOD FOR LUBRICATING CORE DRILLS

FIELD OF THE INVENTION

This invention relates generally to a device and method for lubricating core drills, and more particularly, to a method and core drill having an insert for providing lubrication during drilling and chamfering operations.

DISCUSSION OF THE PRESENT TECHNOLOGY AND TECHNICAL PROBLEMS

It is conventional practice to drill holes through glass products, e.g., automotive lites, to prepare them for assembly line and other operations. The drilling process usually includes the steps of employing a bottom core drill to first drill from the bottom surface of the glass product to approximately the center thereof, and to then retract the bottom drill. Thereafter, a top core drill is employed to drill from the top surface of the glass product in direct alignment with the bottom drilled portion, to just beyond the terminal point of the bottom drilled portion, whereupon the glass core plug thus formed falls into a disposal bin, thereby creating a hole.

The type of drill usually used in the above-described glass drilling operation is a diamond core drill having a top, hollow shank portion and a downwardly extending generally cylindrical, hollow drilling portion provided with a matrix of diamond drilling elements disposed on both the inside and outside to provide inside and outside drilling surfaces. These core drills are commonly cooled during the drilling operation to counteract the heat generated by the friction occurring between the drilling surfaces and the surfaces of the glass product being drilled. As is appreciated by those skilled in the art, excessive heat and friction may cause cracks and other defects in the glass product being drilled, which defects weaken the structural integrity of the product.

One cooling technique includes directing a stream of lubricating fluid, usually water, downwardly through the bores of the shank portion and the drilling portion of the drill, to lubricate and cool the glass and drilling surfaces, to reduce the amount of friction and heat occurring therebetween. The above technique is acceptable for "straight hole" glass core drilling operations. However, the above technique is not acceptable for drilling chamfered or beveled holes due to loss of the lubricating/cooling fluid prior to the chamfering step. Chamfered, or beveled, holes are made using chamfering core drills. These drills usually include a top, hollow shank portion, a chamfering portion having a downwardly and inwardly extending chamfering surface, and a drilling portion extending downwardly from the inner termination point of the chamfering surface. The chamfering surface and inner and outer surfaces of the drilling portion are each provided with a matrix of diamond drilling elements.

The same procedural sequence as previously discussed for drilling a "straight hole" is employed to drill a chamfered hole with a chamfering core drill. The problem arises after the glass core plug has been removed, because the lubricating fluid which is directed downwardly through the bore of the drill escapes freely through the hole due to the absence of the glass core plug. Consequently, when the chamfering surface frictionally engages the edge periphery of the top hole, there is little, if any, lubricating fluid available to cool the friction and heat generated. The result is usually defects in the surrounding region of the glass product, which can weaken the structural integrity thereof.

It would be advantageous, therefore, to provide a chamfering core drill which eliminates the limitations of the presently available chamfering drills.

SUMMARY OF THE INVENTION

This invention relates to an insert securably mountable within the interior bore of a chamfering core drill for permitting a supply of lubricating/cooling fluid to the drilling and chamfering surfaces. In this manner, the friction and heat generated during drilling and chamfering are minimized to prevent the formation of cracks and other defects in the article, e.g., a glass sheet being drilled. The insert preferably includes a plurality of fluid flow diversion jets, disposed in fluid-delivering relationship to a like number of orifices or channels provided by the core drill. The jets divert a portion of the lubricating fluid outwardly through the orifices to the chamfering surfaces, to lubricate and cool the chamfering surfaces and the surfaces of the article being chamfered sufficiently to prevent thermal damage to the article during chamfering. The remainder of the fluid moves through a fluid passageway provided by the insert, to supply fluid to the drilling surfaces to lubricate and cool the drill and article during the drilling of the article, sufficiently to prevent thermal damage to the article.

This invention also relates to a method for supplying lubricating/cooling fluid from within the core drill, to the drilling and chamfering surfaces of a core drill during drilling and chamfering operations to prevent thermal damage to an article being drilled and chamfered.

DETAILED DESCRIPTION OF THE INVENTION

Figure 1:
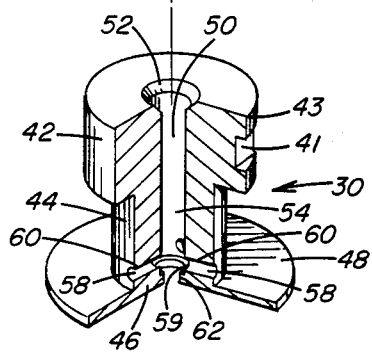
FIG. 1 is a vertical, cross-sectional, isometric view of the core drill and insert of the present invention shown in blown-apart, disassembled condition.

Referring now to the drawings, and more particularly to FIG. 1, there is shown a core drill 2 embodying features of this invention. The core drill 2 includes an elongated shank portion 4 and a generally cylindrical drill body portion 6. The body portion 6 includes a generally cylindrical top portion 8, and a generally cylindrical bottom or drilling portion 10, of a lesser outer diameter than top portion 8. The top portion 8 and bottom, or drilling portion 10, are interconnected by a downwardly and inwardly sloped beveled portion, or chamfering surface 9. The shank portion 4 has an inner, longitudinal bore 12 which fluidly communicates, at its upper end, with a source (not shown) of lubricating/cooling fluid, which is preferably water, and which fluidly communicates, at its lower end, with upper region 13 of bipartite, internal chamber 15 of the drill body portion 6 of the core drill 2. The bipartite chamber 15 includes a lower region 17 having a greater diameter than that of upper region 13, whereby a shoulder 20 is formed at the interface of the upper region 13 and the lower region 17. A matrix 22 of diamond drilling elements 24 is affixed to the outer and inner surfaces of the drilling portion 10 to provide outer and inner drilling surfaces 26, 32, respectively; and to the chamfering surface 9 of the drill body portion 6. As will be appreciated, the shape, contour, configuration, affixation technique, etc., of the diamond drilling elements is not limiting to the invention, and any convenient type of drilling element or affixation technique may be used in the practice of the invention. As will further be appreciated, the above construction of the core drill is not limiting to the invention, but is presented to illustrate an environment in which the insert of the instant invention may be used.

Figure 2:
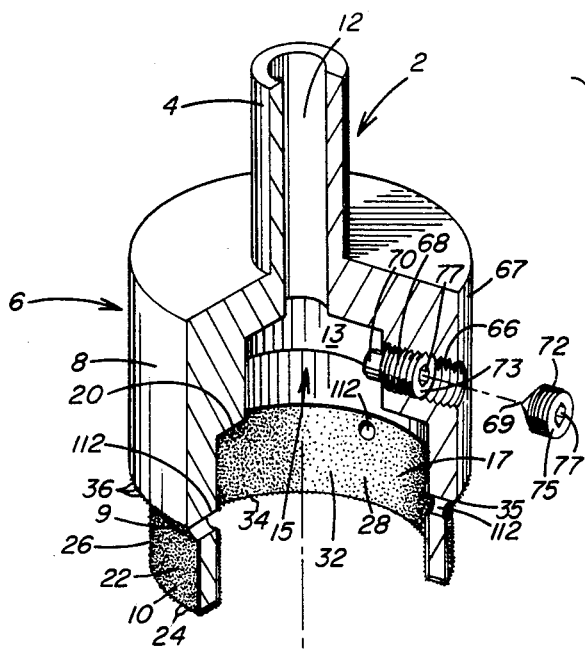
FIG. 2 is a cross-sectional, elevational view of the core drill and insert of the present invention shown in assembled condition.
Figure 2:
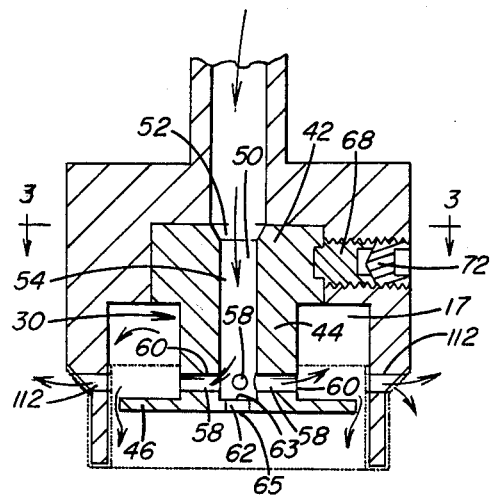

The discussion will now be directed to an insert incorporating features of the invention. Referring now to FIGS. 1 and 2, insert 30 is securably mounted within the bipartite chamber 15 of the core drill 2, in any convenient manner. The insert 30 has a generally cylindrical head portion 42 provided with a recessed, generally cylindrical port 41 on one side 43 thereof for purposes which will hereinafter be developed.

A generally cylindrical intermediate portion 44 of a smaller diameter than the head portion 42 extends downward from head portion 42, as shown in FIG. 1, and terminates in a bottom, generally circular plate member or flange 46 of a larger diameter than head portion 42.

Figure 3:
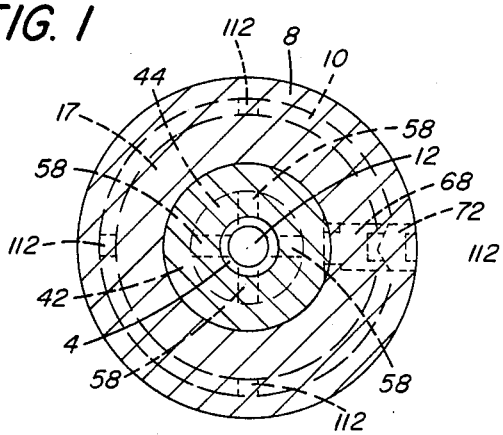
FIG. 3 is a full view taken along line 3—3 of FIG. 2.

A longitudinal, fluid flow bore 50 extending downward through the portions 42, 44 and flange 46 has a downwardly tapering throat 52 and radial axis preferably coincident with the radial axis of the inner bore 12 of the shank portion 4. The upper diameter of the throat 52 of the bore 50 is preferably equal to the diameter of inner bore 12, and the lower diameter of the throat 52 defines the intermediate diameter 54 of the bore 50. Lower diameter 62 of fluid flow-bore 50, or hole 62 of the flange 46 has a smaller diameter than the diameter of the intermediate portion 54 of the bore 50. A plurality, preferably four, as shown in FIG. 3 of equally spaced-apart transverse bores 58, i.e., disposed at 90 degrees to each other, provide fluid communication between the outer surface of the intermediate portion 44 and the bore 50 of the insert 30.

In a preferred embodiment, a threaded, transverse port 66 is provided through one side 67 of the top portion 8 of the drill body portion 6 of the core drill 2 for receiving a half-dog set screw 68 having a generally cylindrical protuberance 70 which engages the recessed, generally cylindrical port 41, to secure the insert 30 within the bipartite chamber 15 of the core drill 2 to prevent movement of the insert 30 due to the rotational forces of drilling and chamfering. Preferably, a locking screw 72 threadably mounted within the threaded port 66 prevents rotation of the set screw 68 by conical inner surface 69 of the locking screw 72 engaging head 73 of the screw 68. The head 75 of the locking screw 72 and the head 73 of the set screw 68 are each provided with a recessed port 77 for receiving an allen wrench (not shown) to facilitate the insertion and removal of the set screw 68 and the locking screw 72 into and out of the port 66.

In the following discussion, the core drill 2 of this invention is described for drilling chamfered holes in an automotive lite 80. However, as will be appreciated, the invention is not limited thereto, and may be used to drill chamfered holes in any other type of article which is susceptible of being core drilled.

Figure 4:
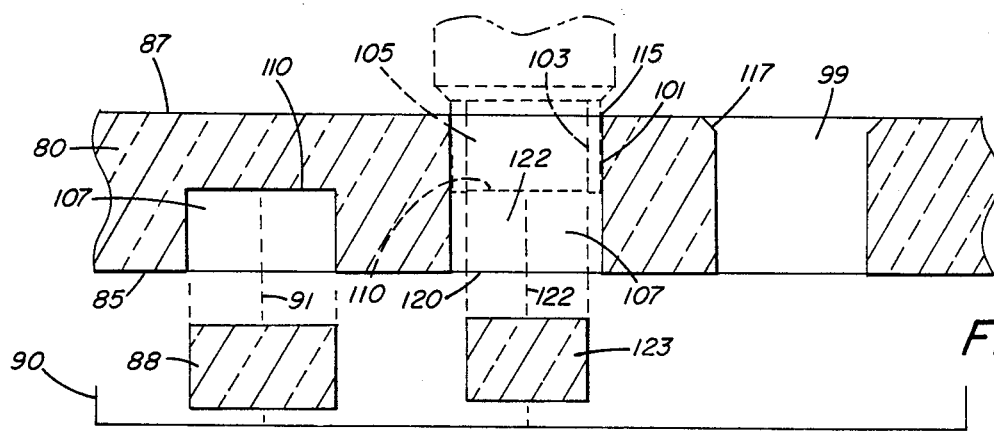
FIG. 4 is a cross-sectional elevational view of a glass sheet depicting, sequentially from left to right, the basic steps for drilling a chamfered hole in a glass sheet, in accordance with the teachings of this invention.

With reference to FIG. 4, the bottom surface 85 of the lite 80 is drilled in any convenient manner to a point approximately halfway between upper surface 87 and lower surface 85 of the lite 80 to provide a bottom drilled portion 107. The core drill 2 of the invention is then employed in the following manner to drill a chamfered hole 99 in the lite 80. Water is continuously moved in any convenient manner, preferably under high pressure, e.g., 50 psi, through the inner bore 12 of the shank portion 4 and the fluid flow bore 50 of the insert 30. The flow velocity of the water increases as it passes through tapering throat 52. A drive source (not shown) rotates the core drill 2 as the core drill 2 is urged downwardly to drivably rotate drilling portion 10 through the upper surface 87 of the lite 80 to drill a top portion 105 in direct alignment with previously drilled bottom drilled portion 107, by way of inner drilling surface 32 cuttingly, rotationally engaging the lite 80 until the core plug 123 falls or drops through the bottom drilled portion 107 into the container 90, as shown by the phantom lines 122 in FIG. 4. During the drilling of the top drilled portion 105 water preferably continuously flows through the inner bore 12 of the shank portion 4, the downwardly tapering throat 52 of fluid flow bore 50 of the insert 40 which increases the water flow velocity, through intermediate portion 54 of the bore 50, and finally through the lower diameter 62 of the bore 50, or hole 62 of flange 46, which further increases the water flow velocity. The upper surface 87 of the lite 80 restricts the flow of water from the hole 62 into the lower portion 17 of the bipartite chamber 15 of the core drill 2. This restriction of the water flow in combination with the diametrical difference between the hole 62 and the intermediate portion 54 of the bore 50, causes the water to be forceably diverted through the transverse bores, or fluid flow diversion jets 58 of the insert 40 into a cavity of the lower portion 17 of the chamber 15 of the core drill 2 formed by the upper surface 48 of the flange 46, the outer surface of the intermediate portion 44 of the insert 40, and the inner surface 32 of the core drill 2. A portion of the fluid in the cavity flows downward around the flange 46 but the remaining portion in the cavity flows out of channels 112 of the core drill 2 and against the chamfering surface 9 of the core drill 2. Preferably, the radial axes of the channels 112 are aligned with the radial axes of the respective ones of the jets 58. The water flowing around the flange 46 cools the inner drilling surface 28 and the outer surface of the top of the core plug 123 being drilled. The water flowing out of the channels 112 cools the outer drilling surface 22 and inner surface of the lite 80 being drilled.

After the lite 80 has been drilled to just beyond the termination point of the lower drilled portion 107, the core plug 123 drops into the receiving bin 90 and a hole 105 is formed. As the core drill 2 is further urged into the hole 99, the chamfering surface 9 engages the upper surface 87 of the lite 80 to form a chamfer 117 as shown in the right side of FIG. 4. During the chamfering, the chamfered surface 117 of the lite 80 is cooled in the following manner. When the core plug 123 falls out of the hole 99 into receiving bin 90, a first portion of the water flow moving through the insert bore 50 passes through the hole 62 of the flange 48, and due to the smaller diameter of the hole 62 relative to the intermediate diameter 54 of the insert bore 50, sufficient flow resistance to the water is established to divert a second portion of the water flow moving through the insert bore 50 through the fluid flow diversion jets 58 of the insert 30, as previously discussed during the drilling of the top drilled portion 105, whereupon the second portion of the water is directed through channels 112 against chamfering surface 9 of the core drill 2 and chamfer 17 of the hole 99 to cool the chamfering surface 9 and chamfer 17 to prevent thermal damage to the lite 80 being chamfered. As can be seen in FIG. 2, the flange 48 of the plate member 46 of the insert 30 functions to maintain the water in an accurate delivery path in the course of its travel between transverse bores or fluid flow diversion jets 58 and corresponding transverse channels 112 of core drill 2, which are preferably diametrically, directly aligned with transverse bores 58, despite any fluctuations which may occur in the water pressure. Further, due to the high pressure at which the water is preferably transmitted to transverse bores 58, the water is "jetted" therethrough as a fast-moving, narrow stream of fluid, and as such, is generally accurately delivered through channels 112 to the chamfering surface 9 of the core drill 2. In this manner, the formation of cracks and other defects in lite 80 due to the generation of excessive friction and heat during the chamfering procedure are minimized, if not eliminated.

Various modifications and variations of the basic inventive concept hereinabove taught may appear to those skilled in the art without departing from the spirit and scope of this invention, as the above description was presented for illustrative purposes only. For example, the type, shape, size, location, and configuration of the transverse bores provided through the insert, the corresponding core drill channels, and the fluid flow passageway, can be varied in any desired manner, as these are not limiting features of the present invention. Also, the type, shape, size, securement, configuration, or location of the insert is not limiting to the invention.

What is claimed is:

1. A method of drilling a chamfered hole in an article, with a core drill having chamfering and inner and outer drilling surfaces, comprising the steps of:
   (a) drilling a hole in the article with the core drill;
   (b) chamfering the hole with the core drill;
   (c) supplying lubricating/cooling fluid to the inner and outer drilling surfaces during said drilling steps; and
   (d) supplying lubricating/cooling fluid from within the core drill to the chamfering surface during said chamfering step.

2. The method as set forth in claim 1 wherein said article is a glass article.

3. The method as set forth in claim 2 wherein said glass article is an automotive lite.

4. A core drill for drilling a chamfered hole in an article, comprising:
   a body having an inner bore, outer and inner drilling surfaces, and a chamfering surface;
   first means for diverting a first portion of a lubricating/cooling fluid from said inner bore to said inner drilling surfaces to lubricate and cool said inner drilling surfaces and the article portion being drilled and chamfered; and
   second means for diverting a second portion of the lubricating/cooling fluid from said inner bore to said chamfering surface and outer drilling surface to lubricate and cool the chamfering and outer drilling surfaces and the article portion being drilled and chamfered to at least minimize thermal damage to the article.

5. The core drill as set forth in claim 4, wherein said body further includes a chamber and wherein said first diverting means includes an insert mounted in said chamber and having a passageway disposed in fluid receiving relationship to said inner bore for allowing said first portion of the lubricating/cooling fluid therethrough to said inner drilling surfaces to lubricate said inner drilling surfaces.

6. The core drill as set forth in claim 5, wherein said insert of said first diverting means further includes a second passageway disposed in fluid-receiving relationship to said inner bore of the core drill for receiving a second portion of the lubricating/cooling fluid and wherein said second diverting means includes at least one channel provided by said body and disposed in fluid-receiving relationship to said second passageway and in fluid-delivering relationship to the body exterior for lubricating and cooling said chamfering surfaces and said outer drilling surfaces with said second portion of the lubricating/cooling fluid.

7. The core drill as set forth in claim 6, wherein said core drill is a diamond core drill for drilling glass articles.

8. The core drill as set forth in claim 7, wherein said glass articles are automotive lites.

9. In a core drill having an inner bore, an inner chamber fluidly connected to the inner bore, chamfering, and inner and outer drilling surfaces, for drilling a chamfered hole in an article, a lubricating means for supplying the lubricating/cooling fluid to the chamfering and inner and outer drilling surfaces, comprising:
   (a) at least one channel provided through the core drill in fluid-delivering relationship to the chamfering and outer drilling surfaces;
   (b) an insert comprising:
      (i) a first portion having a longitudinal bore provided therethrough in fluid-receiving relationship to the inner bore of the core drill, and at least one transverse bore provided therethrough in fluid-receiving relationship to said longitudinal bore and in fluid-delivering relationship to said at least one channel, for delivering a first portion of the lubricating/cooling fluid to the chamfering and drilling surfaces, for lubricating/cooling the same; and
      (ii) a second portion, provided adjacent to said at least one transverse bore, comprising a longitudinal passageway of a diameter less than the diameter of said longitudinal bore of said first portion, disposed in fluid-receiving relationship to said longitudinal bore and in fluid-delivering relationship to the drilling surfaces for receiving a second portion of the lubricating/cooling fluid from said longitudinal bore, and for delivering said second portion to the drilling surfaces, for lubricating/cooling the same;
   (c) means for securably mounting said insert within the chamber of the core drill.

10. The lubricating means as set forth in claim 9, wherein it further comprises means for maintaining said first portion of the lubricating/cooling fluid in an accurate delivery path between said at least one transverse bore and said at least one channel, thereby insuring delivery of said first portion of the lubricating/cooling fluid from said at least one transverse bore to the chamfering surfaces through said at least one channel, despite any fluctuations which may occur in the pressure of the lubricating/cooling fluid.

11. The lubricating means as set forth in claim 10, wherein said first portion of said insert has four equally spaced-apart transverse bores provided therethrough in fluid-receiving relationship to said longitudinal bore, and wherein further, the core drill is provided with a corresponding number of channels therethrough, wherein each said channel is disposed in fluid-receiving relationship to its corresponding transverse bore.

12. The lubricating means as set forth in claim 11, wherein the axis extending through said longitudinal bore or said first portion of said insert is coincident with the axis of the inner bore of the core drill.

13. The lubricating means as set forth in claim 12, wherein said transverse bores are each disposed perpendicularly to the radial axis of said longitudinal bore.

14. The lubricating means as set forth in claim 13, wherein said second portion further includes maintaining means, said maintaining means including a flange projecting radially outwardly at a bottom end of said first portion, adjacent to said transverse bores.

15. The lubricating means as set forth in claim 14, wherein said mounting means is an attachment means rigidly interconnecting said insert and the core drill.

16. The lubricating means as set forth in claim 15, wherein said first portion of said insert is of a generally cylindrical configuation.

17. The lubricating as set forth in claim 16, wherein said first portion of said insert includes a first part having a generally cylindrical shape and a second part having a generally cylindrical shape and a lesser diameter than said first part, wherein said first part and said second part are interconnected and together include said insert longitudinal bore and wherein further, said second part includes said transverse bores.

18. The lubricating means as set forth in claim 17, wherein said flange of said second portion is of a greater diameter than said first part of said first portion of said insert.

* * * * *